(12) United States Patent
Garimella et al.

(10) Patent No.: US 8,286,143 B2
(45) Date of Patent: Oct. 9, 2012

(54) METHOD AND SYSTEM FOR MONITORING CODE CHANGE IMPACT ON SOFTWARE PERFORMANCE

(75) Inventors: Krishna S. Garimella, San Jose, CA (US); Yang Zhong, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1177 days.

(21) Appl. No.: 11/939,536

(22) Filed: Nov. 13, 2007

(65) Prior Publication Data

US 2009/0125891 A1  May 14, 2009

(51) Int. Cl.
*G06F 9/44* (2006.01)
(52) U.S. Cl. .......................... 717/131; 717/124; 717/127
(58) Field of Classification Search .................. 717/131
See application file for complete search history.

(56) References Cited

U.S. PATENT DOCUMENTS

| | | | |
|---|---|---|---|
| 5,630,139 A * | 5/1997 | Ozaki ........................... | 717/167 |
| 7,543,194 B2 * | 6/2009 | Kwong et al. .................. | 714/48 |
| 7,937,690 B2 * | 5/2011 | Casey ........................... | 717/128 |
| 2004/0088602 A1 * | 5/2004 | Cohen et al. ................... | 714/38 |
| 2005/0183074 A1 * | 8/2005 | Alexander et al. ............ | 717/144 |
| 2006/0026465 A1 * | 2/2006 | Kwong et al. .................. | 714/38 |
| 2007/0006041 A1 * | 1/2007 | Brunswig et al. .............. | 714/38 |
| 2007/0061626 A1 * | 3/2007 | Nelson et al. .................. | 714/38 |
| 2007/0277155 A1 * | 11/2007 | Casey ........................... | 717/124 |
| 2008/0072118 A1 * | 3/2008 | Brown et al. .................. | 714/763 |
| 2008/0222608 A1 * | 9/2008 | Gartner et al. ................. | 717/124 |
| 2009/0007078 A1 * | 1/2009 | Hoyek et al. .................. | 717/131 |
| 2009/0070734 A1 * | 3/2009 | Dixon et al. ................... | 717/102 |
| 2009/0125891 A1 * | 5/2009 | Garimella et al. ............. | 717/131 |

OTHER PUBLICATIONS

John D. Musa,"Validity of Execution-Time Theory of Software Reliability", IEEE Transactions on Reliability, vol. R-28, No. 3, Aug. 1979, retrived from <http://ieeexplore.ieee.org/stamp/stamp.jsp?tp=&arnumber=5220561>, total pp. 11.*

Ebrlich et al., "Application of Software Reliability Modeling to Product Quality and Test Process", 1990 IEEE, retrived from <http://ieeexplore.ieee.org/stamp/stamp.jsp?tp=&arnumber=63608> total pp. 9.*

* cited by examiner

*Primary Examiner* — Don Wong
*Assistant Examiner* — Marina Lee
(74) *Attorney, Agent, or Firm* — Sawyer Law Group, P.C.

(57) ABSTRACT

Method and system for detection and notification of performance changes in program code. In one aspect, stored previous routine test results and current routine test results are accessed, indicating a previous and current time of execution of the program code, the current routine test performed later than the previous routine test. The previous and current times of execution are automatically compared and a change in performance of the program code is determined. Users are notified of the change in performance, where each user is notified after the change in performance is determined to be significant enough to the particular user according to associated predetermined criteria.

20 Claims, 8 Drawing Sheets

| PROFILE | NESTED DEPTH OF PERF. CHANGE ⌐202 | LOWER BOUND OF PERF. DOWNGRADE MINUS NEW TEST CASES ADDED, WEIGHTED ⌐204 | LOWER BOUND OF PERF. IMPROVEMENT MINUS OLD TEST CASES REMOVED, WEIGHTED ⌐206 | ALLOW CONFIG. CHANGE ⌐208 | FAILURE CHANGE UPPER BOUND ⌐210 | ERROR CHANGE UPPER BOUND ⌐212 |
|---|---|---|---|---|---|---|
| MANAGER | 1 | 30% | 30% | NO | 10% | 10% |
| DEVELOPER | 2 | 20% | 20% | YES/NO | 20% | 20% |
| COMPONENT INTEREST | 9 | 10% | 10% | YES/NO | 30% | 30% |

FIG. 4

METHOD AND SYSTEM FOR MONITORING CODE CHANGE IMPACT ON SOFTWARE PERFORMANCE

FIELD OF THE INVENTION

The present invention relates to software development environments, and more particularly to the detection and notification of performance changes in program code.

BACKGROUND OF THE INVENTION

Performance analysis is used in software engineering to analyze the behavior of a program. This can be accomplished by running a test on program code, retrieving information provided by the code as the program executes, and determining if the code executes correctly or fails in execution at a particular point. In some performance analysis tools, the output to be analyzed is a stream of recorded events (a trace), or a statistical summary of the events observed (a profile). Using performance tests, the functionality of the program can be analyzed, understood, and optimized based on desired criteria, such as speed, processor usage, and/or memory usage. Such performance analysis tools are essential for understanding how programs perform so that they may be effectively improved.

One problem with existing performance analysis tools is the significant amount of effort required to determine the effect in performance of an introduced change in code. For example, performance tests on a software code project are typically made after a release of the code project and compared to a previous release, and such releases are commonly provided, at most, one or two times a year. By the time code performance has been tested, so many code changes have been introduced to the code that it becomes difficult to find the sources of performance changes introduced by the changes to the code. Furthermore, performance tests are manually performed as separate, independent tasks by a user, and thus require scheduling and attention to be performed regularly.

Accordingly, what is needed is the ability to automatically, promptly, and conveniently detect performance changes in program operation introduced by program code changes, and to notify users of significant performance changes in the code. The present invention addresses such a need.

SUMMARY OF THE INVENTION

The invention of the present application relates to detection and notification of performance changes in program code. In one aspect of the invention, a method for determining performance changes in program code includes accessing stored previous test results indicating a previous time of execution of the program code, the previous test results provided from a previous routine test of the program code. Stored current test results are accessed, indicating a current time of execution of the program code, where the current test results are provided from a current routine test of the program code performed later than the previous routine test. The previous time of execution and the current time of execution are automatically compared and a change in performance of the program code is determined. Predetermined criteria associated with each of a plurality of users are checked, and one or more particular users are notified of the change in performance, where each of the one or more particular users is notified after the change in performance is determined to be significant enough to the particular user according to the associated predetermined criteria.

The present invention detects performance changes in program code automatically after routine tests without requiring specific attention to performance tests. The invention allows detection of changes in code performance more frequently, allowing performance degradation to be more easily traced to specific code changes. Furthermore, users can specify the criteria under which they will be notified of performance changes, allowing significant reduction in effort to finding relevant performance changes and correcting performance degradation in code.

BRIEF DESCRIPTION OF THE FIGURES

FIG. 4 is a table illustrating an example of three different subscriber profiles which can be used in some embodiments of the invention;

DETAILED DESCRIPTION

The present invention relates to software development environments, and more particularly to the detection and notification of performance changes in program code. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely software embodiment or an embodiment containing both hardware and software elements. A software embodiment can include but is not limited to firmware, resident software, microcode, etc. Furthermore, the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk (e.g., CD-ROM, DVD, etc.).

To more particularly describe the features of the present invention, please refer to FIGS. 1-5B in conjunction with the discussion below.

The present invention automatically detects the impact of changes to program code on the performance of the code. If relatively significant performance changes are detected, then users can promptly be notified of this change in performance. Thus, not only can performance degradation be investigated and then fixed and/or avoided, but also the performance improvement can be analyzed and verified and then promoted to other similar platforms or programs.

Figure 1:
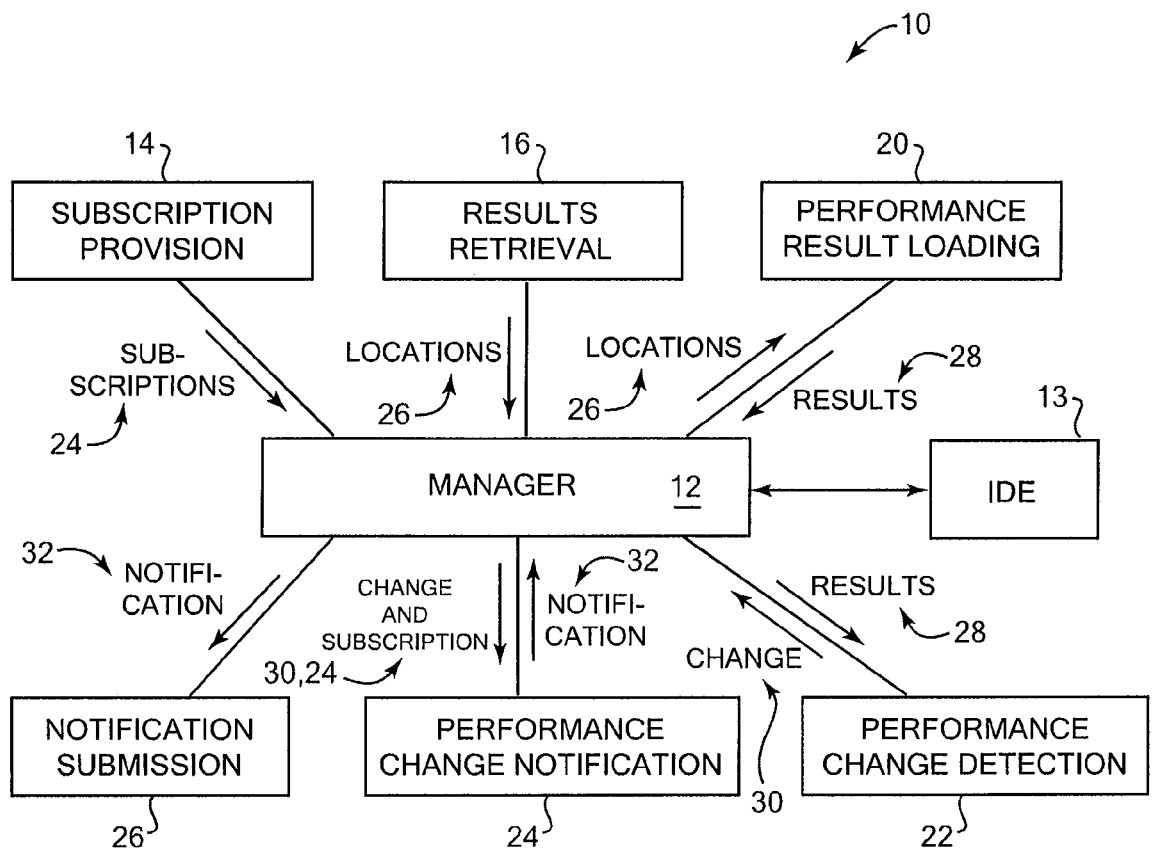
FIG. 1 is a diagrammatic illustration of a system of the present invention for providing detection and notification of code change impact on program code performance.

FIG. 1 is a diagrammatic illustration of a system 10 of the present invention for providing detection and notification of code change impact on program code performance. System 10 can be implemented on one or more computer systems or similar electronic devices. Such computer systems can be implemented on well-known system hardware, including one or more microprocessors, memory (RAM, ROM, Flash memory, etc.), and various peripherals including storage devices (hard disk, memory, optical storage such as DVD-ROM and CD-ROM, etc.), input devices (keyboards, pointing devices), output devices (monitors, printers) communication devices and networking devices, etc. The system 10 can be implemented on a single system, or on multiple distributed systems that can communicate, e.g., over a communications network.

System 10 can be in communication with a development environment, running on the same computer system as system 10 or on a different system, in which program code is developed and tested by one or more users such as programmers and software developers. At various stages of software development, software program code can be checked in, tested and the results provided within the environment provided by system 10. For example, in some embodiments system 10 provides an integrated development environment (IDE) for program code which can provide uniform user interfaces for one or more of a source code editor, a compiler, an interpreter, build automation tools, a debugger, GUI construction tools, version control system, object oriented development tools, etc. The IDE can be used for program code written in one or more programming languages. For example, the open-source Java-implemented Eclipse IDE from the Eclipse Foundation, and/or the IBM Rational Functional Tester which can be integrated with Eclipse, and/or other well-known IDE interfaces and products can be used with the present invention.

System 10 includes a number of functional blocks of the present invention which can detect and notify users of changes to program code performance. In the described embodiment these blocks are implemented in software, but in other embodiments one or more of the components can be implemented in hardware or a combination of hardware and software. The described embodiment arranges the functional blocks in terms of information communication between different functions. For example, in some embodiments each code block can be distributed and can run with little knowledge of others. In other embodiments, the functions of the blocks can be provided differently, e.g., combined into larger functional blocks or split into smaller functional blocks, and/or blocks can communicate with each other directly rather than through a manager 12.

Manager block 12 can provide the main control function over the different components of the system 10 of the present invention. For example, manager 12 determines when the method of the present invention is initiated, receives various information from blocks, and outputs that information to other blocks which can process the information. The manager can coordinate the communication between different blocks. In some embodiments, for example, the manager 12 can be implemented to use a standard IDE format, such as Eclipse, and declare the blocks as extension points. The manager can also communicate with an IDE 13 so that functions and actions in the IDE (such as initiation or completion of performance tests) are known by the manager 12, and the manager 12 can provide information to the IDE 13. For example, the manager can be an extension plug-in to integrate with IDE Unit Tests and IDE CVT/FVT/SVT tests.

Subscription provision block 14 accesses subscription information from one or more storage devices of a computer system. Subscription information is associated with one or more users (subscribers) that have "subscribed" to the notification of changes provided by the present invention, and the subscription information in each subscription includes all the preferences of the associated subscriber. The subscription information also includes identifications of each particular program code portion or project for which the subscriber wishes to be notified of performance changes. The subscription information 24 is provided to the manager 12, and the manager 12 can provide that subscription information to relevant blocks, such as performance change notification block 24.

Results retrieval block 16 provides information about stored performance test results (e.g. logs) for routine performance tests of functionality of program code that have been previously performed. Herein, the term "routine" performance test refers to common and frequent tests that are performed to test code, e.g., typically the functionality of code. In many cases, such tests are performed every day or other short time period. For example, routine functionality tests are performed on software "builds" of the code that are changed or updated every day or more frequently, where each routine test is performed on the next build. These "routine" tests pertinent to the present invention are distinguished from other non-routine tests, such as infrequent performance tests provided after a general "release" of code (e.g. after many months or one or more years of code development). Different routine tests may be performed for different portions or subportions of the code, and/or at different stages of the code's development. For example, one or more well-known routine tests known as unit tests or "sandbox" tests may have been performed for individual components of program code (e.g., command line unit tests, tests using software such as Maven, Ant, Make, etc.). Other well-known types of routine tests performed later in the code development include Build Verification Tests (BVTs), Functional Verification Tests (FVTs), System Verification Tests (SVTs), and GUI automation tests, which when performed provide test results that can be stored. In some embodiments, a standard test results log format can be used, such as a ".execution" file for the Test and Performance Tools Platform (TPTP) for the Eclipse IDE, an Apache Ant test log format, or other known format. Other embodiments can use a custom test log format. The results retrieval block 16 provides to manager 12 the storage locations 26 of previous performance test results that can be compared to a more recent ("current") test result to detect performance changes for the present invention. In some embodiments, the results retrieval block 16 provides the storage locations 26 of particular previous results that are pertinent to the preferences determined in a user's subscription information. For example, if subscribers prefer to compare to one or more particular previous tests, then only the locations 26 of these test results need be provided. In some embodiments, the provided location information 26 can include the storage location or work directory of previous and current performance results, filenames or other identifications of the results, and subscriber preferences, profiles, and the particular format for the results.

Performance result loading block 20 provides the performance test results from the desired previous routine tests and from the current routine test that the program code has undergone. The block 20 receives the locations 26 of the previous test results from the manager 12 and provides the results 28 of the desired previous tests and the current test to the manager 12.

In some embodiments, the performance result loading block 20 can include multiple different loaders, where each loader can read a particular format of test result, and translate that test result to data that can be read by the manager 12. Each different format of test results can have its own loader to read the test result format and provide the test results to the manager 12 in a standardized protocol used by the manager 12. For example, a different loader can be provided for result loading of each type of test including IDE unit tests, IDE component verification tests, IDE functional verification tests, IDE system verification tests, GUI automation tests, or new tests provided at some future date. If a new format of performance results is desired to be checked by the present invention, then a loader can be provided for that new format and easily interfaced to the manager 12, where the new loader translates the results to the manager's protocol.

Performance change detection block 22 determines the change in performance (if any) that has occurred in the program code in the current test, relative to one or more previous test results as indicated by the locations 26. The performance change detection block 22 receives the previous and current test results 28 provided by block 20. The block 22 can detect a change in performance in the overall program code, as well as in any subsections ("components" and sub-components), down to any desired level of sub-component in the program code. The current test results and the previous test results are provided in the same format and so are directly comparable. The time to execute of the code and code components are compared to determine whether the current code and/or sub-sections are taking additional time or less time relative to the previous test(s). The differences between the previous tests and the current tests are recorded as changes 30 which are provided to the manager 12, and indicated in any desired format such as percentage changes.

Performance change notification block 24 receives the changes 30 provided by the change detection block 22, and subscription information 24 provided by the subscription provision block 14. Block 24 determines whether to provide a notification to each of the subscribers of notifications for the program code and/or the system. To make this determination, the block 24 examines the preferences of each subscriber, as provided in the subscription information. The block 24 provides notification information 32 back to the manager 12, the notification information 32 indicating which subscribers should be notified and any other desired information determined from preferences in the subscription information (when to notify based on subscription information, how the notification is to be presented, the desired particulars about the performance changes, etc.).

Notification submission block 26 receives the notification information 32 from the manager 12 and submits the notification to each subscriber indicated in the information 32 and according to any other specified criteria in the information 32, such as when to submit the notification, the presentation of the notification, etc.

Figure 2:
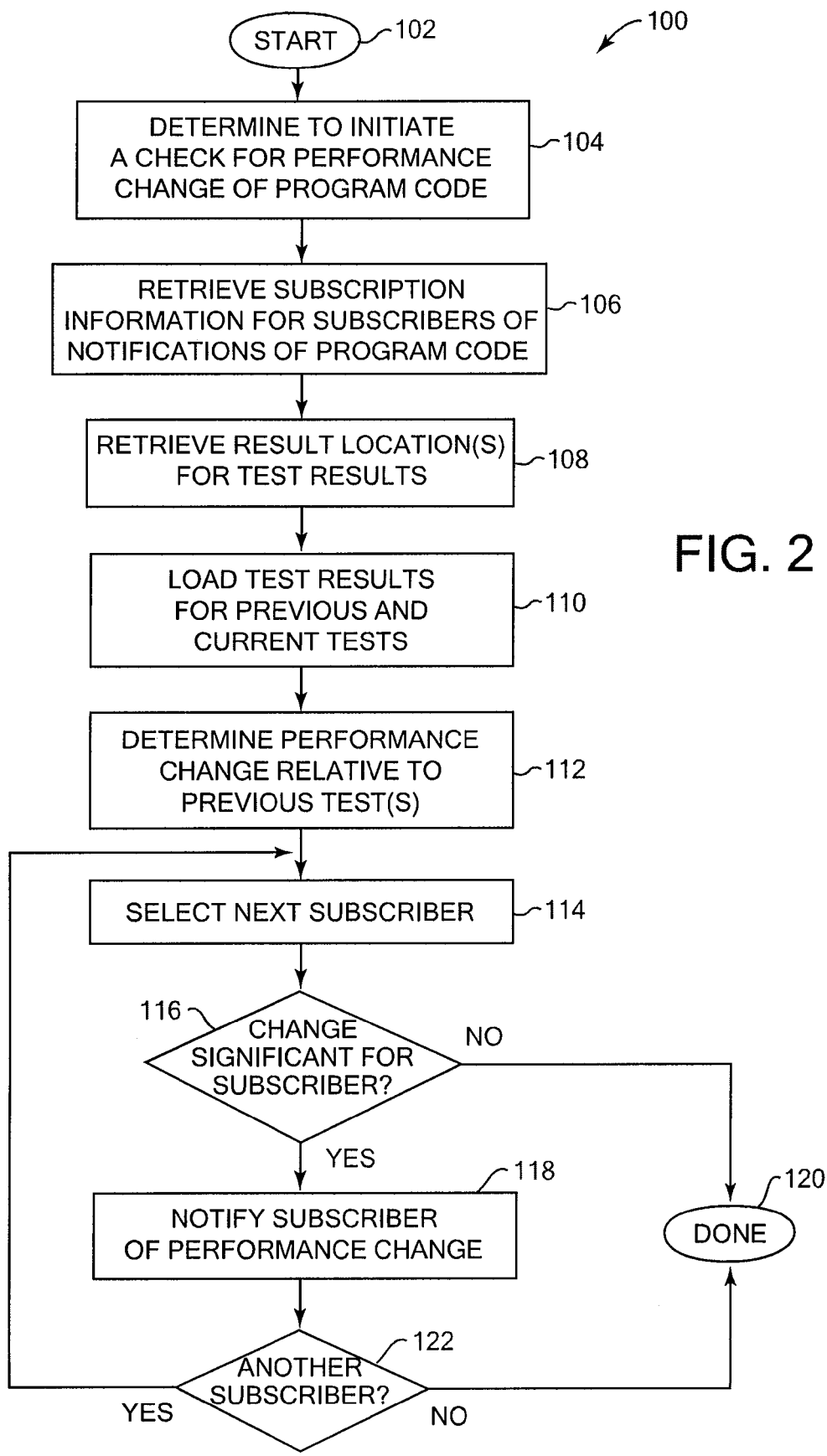
FIG. 2 is a flow diagram illustrating a method of the present invention for providing detection and notification of code change impact on program code performance.

FIG. 2 is a flow diagram illustrating a method 100 of the present invention for providing detection and notification of code change impact on program code performance. The method described herein can be implemented in hardware, software, or a combination of both hardware and software. Method 100 can be implemented using program instructions or code provided on a computer readable medium, such as memory, magnetic tape, a magnetic disk, optical disk, etc. In some embodiments, the method 100 can be implemented by the manager block 12 as described with reference to FIG. 1. Alternatively, the method 100 or portions thereof can be implemented in hardware (logic gates, etc.), or in a combination of hardware and software.

The method begins at 102, and in step 104, it is determined to initiate a check for a performance change in particular program code. A performance change check can be initiated based on one or more predetermined criteria. For example, a performance change check can be initiated each time that the program code (or a portion thereof) is tested, such as after every routine performance test (e.g. build test) run by a developer at the end of every working day (or other short time period) to determine whether the code is functioning properly. In some embodiments, the performance change detection of the present invention can be initiated at other times, such as every specified number of days, or after a predetermined percentage or number of changes have been made to the program code. The "routine" test pertinent to the present invention herein is distinguished from other non-routine tests, such as a relatively infrequent performance tests provided after a general release of code.

Figure 3A:
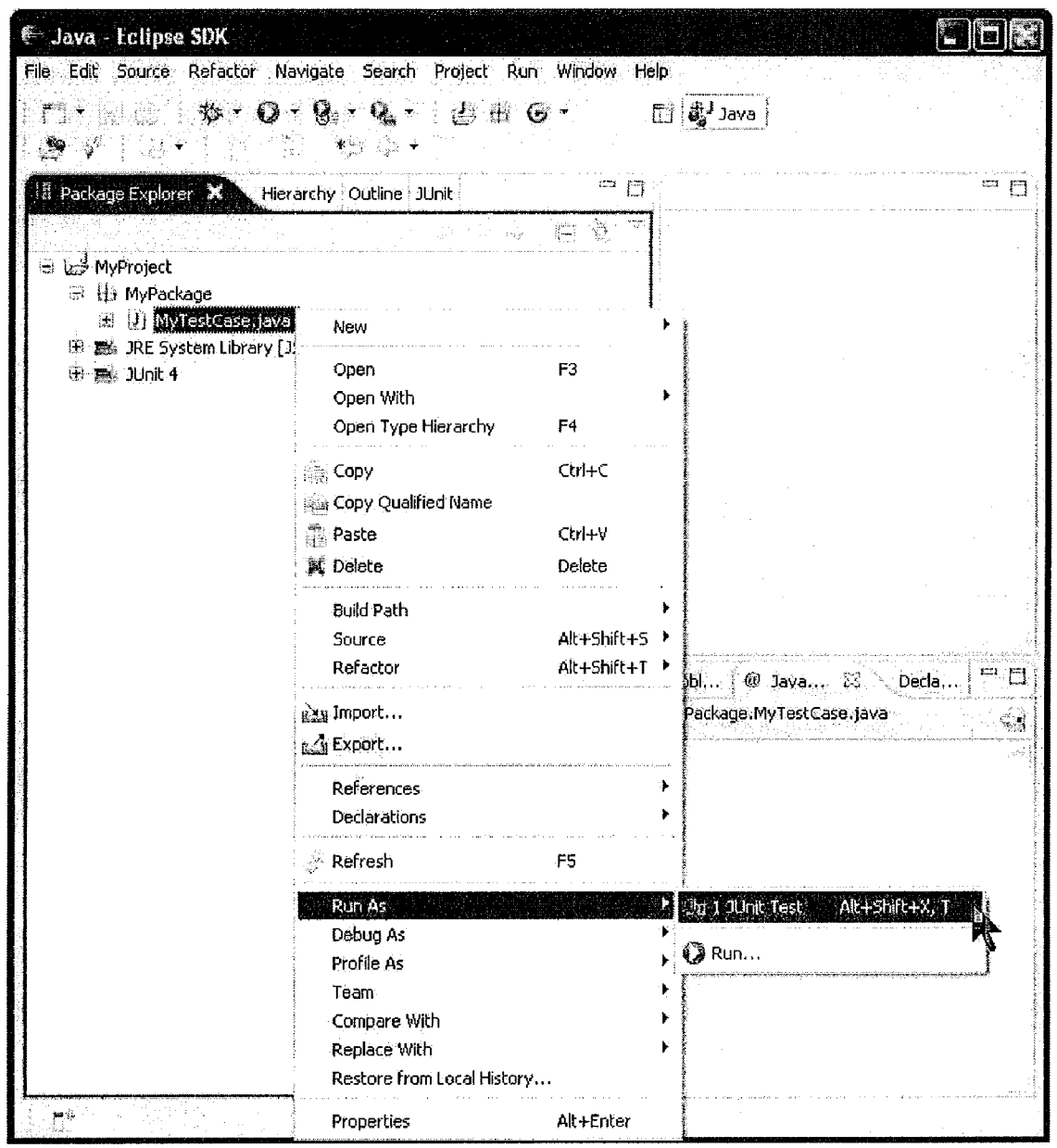
FIGS. 3A and 3B are diagrammatic illustrations of examples of interfaces for selecting a performance test for program code.
Figure 3B:
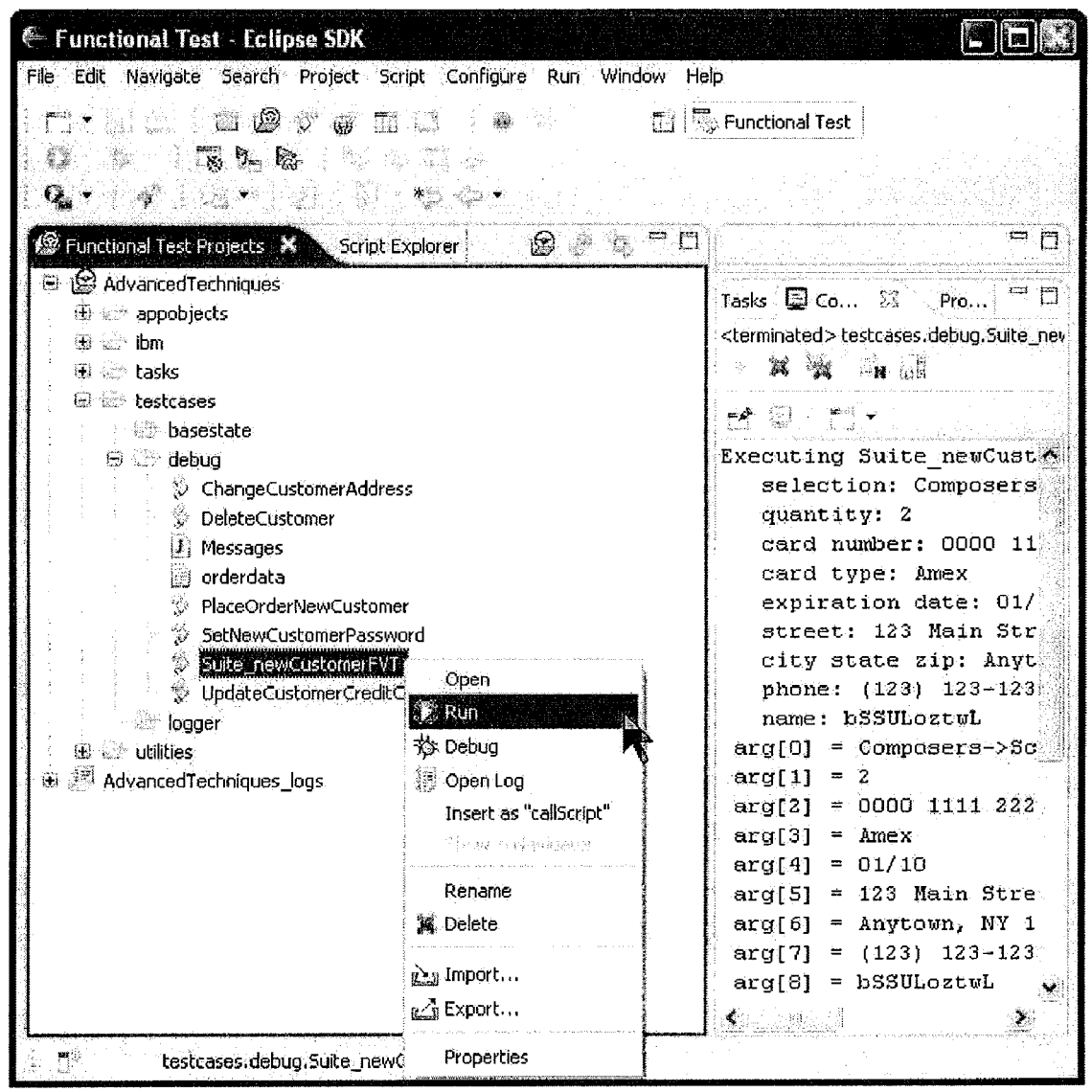

For example, FIG. 3A is a diagrammatic illustration of one example of an IDE interface 150 allowing selection by a user of a performance test for program code, in which a user is initiating a unit test for a component of a program code project to determine whether the unit or component is functioning correctly. FIG. 3B is a diagrammatic illustration of a second example of an IDE interface 152, where a user is selecting a Functional Verification Test (FVT) for program code. After or during such a test, the method 100 of the present invention can be initiated to use the results of the selected unit test or FVT as the current test results, as soon as the results of the performance test are available.

Referring back to FIG. 2, in step 106, the method retrieves stored subscription information for subscribers of notifications for program code. Subscribers are users that have indicated that they wish to be notified if a significant change in the performance of program code occurs. Such users can be users of the same system in which method 100 is implemented, or a different system in communication with the system implementing method 100. A "significant" change is defined by information and preferences included in the retrieved subscription information, which the subscriber has designated for that program code. In some embodiments, the step 106 can retrieve the subscription information for all the subscribers of the system and determine which subscribers desire to receive notifications for the particular program code being detected for performance changes, and for a particular type of performance test that was performed. Thus, each subscriber can designate which program code or projects he or she is subscribed to, i.e., for which code (or code projects) he or she desires to receive performance change notifications. Each program code listing or project can have its own subscription information, and each possible type of performance test for that program code can have its own associated subscription information. In other embodiments, the step 106 can first determine which subscribers are subscribed to the program code, and can then retrieve the relevant subscription information for that program code. For example, the subscription provision block 14 of FIG. 1 can be used to provide subscription information to the manager 12.

In some embodiments, the subscription information can include a profile for the associated subscriber that indicates the criteria for notifying that subscriber of code performance changes. Some embodiments can provide each subscriber with a profile for each possible type of performance test performed on the program code by the IDE system. In some embodiments, a number of different standard profiles can be provided, and each subscriber is associated with one (or more) profiles as desired.

As an example of subscription information, FIG. 4 is a table 200 illustrating an example of three different subscriber profiles which can be used in some embodiments of the invention. Additional or different profiles can be used in various different embodiments. Table 200 lists three different profiles in the leftmost column, which are labelled as "Manager," "Developer," and "Component Interest" to indicate the role of the associated subscriber with relation to the program code. The manager profile is intended for a high-level person in a software development organization who may oversee the program code as part of a software project at the high level, and does not need as many details as lower-level users. The developer profile is intended for lower-level users that may do the actual coding or related activities for the code in greater detail than the manager. The component interest profile is intended for a user responsible only for a component of the overall program code listing or project, such as a component developer or contractor. Other or additional profiles can be provided in other embodiments.

The column 202 indicates the nested depth of the performance change that is suitable for the subscriber having the associated profile. The nested depth is the level in a predetermined hierarchy of components with which the profile is associated, where each level lower than the first indicates a sub-component within the previous-level component (e.g., level 3 being a component within a level 2 component of a level 1 component or overall code project, etc.). In the example shown, the manager profile has a nested depth of 1, the developer profile has a nested depth of 2, and the component interest profile has a nested depth of 9. In one example, this indicates that the manager only desires to see top level performance change notifications for the entire code listing or project, not in any components of the code. The developer only desires to see top and second level performance change notifications, which pertain to the first level of component of the overall code project. The example component interest desires to see performance change notifications of nine levels deep, which is the nested level of the code component for which that component interest is responsible. This ninth level is a sub-component of the code project that is nested within eight previous component levels. In other embodiments, the subscriber can designate particular levels or ranges of levels of interest. A subscriber can also designate to only be interested in certain performance tests pertaining to his or her own responsibility of the code project, e.g., an FVT for his or her particular component. The types of tests performed for particular components can be stored and known by the system and retrieved for use in method 100.

The column 204 indicates the lower bound of the performance degradation that will be allowed to trigger a notification for the subscriber of this profile, minus any new test cases added and weighted appropriately. The lower bound is the minimum percentage change (degradation) in the code performance that must be detected before the subscriber is notified of the performance change. The subtraction of new test cases and the weighting of the percentage can be performed in some embodiments (or if the subscriber's preferences indicate to do so) as a compensation for greater accuracy in performance change detection, as described in greater detail below.

The column 206 indicates the lower bound of the performance improvement that will be allowed to trigger a notification for the subscriber of this profile, minus any old test cases that were removed. In some embodiments, the subscriber may desire to be informed of performance improvements, and this column provides the minimum improvement that will trigger the notification. The subtraction of old test cases and the weighting of the percentage can be performed is performed in some embodiments (or if the subscriber's preferences indicate to do so) as a compensation for greater accuracy in performance change detection, as described in greater detail below.

Column 208 indicates whether the subscriber will allow a configuration of the system on which the test results were performed to be changed after the obtaining of the previous test results that are used for comparison to the current test results. A configuration may have been changed in a number of different ways by the time the current test is performed, such as a different database being connected to, different hardware being used, a different CPU or server running the code, etc. If the column shows a "no" indication in this column, then the subscriber for this profile will not be notified of performance changes if the system configuration has been so changed; this subscriber prefers only to be notified if the same system was used in the previous and current tests, leading to more accurate performance change detection. If "yes/no" is indicated, then each individual subscriber of the profile will receive notifications regardless of system configuration changes.

Column 210 indicates the upper bound of the change in the percentage of program components in the tested code that is allowed by the profile to fail internally during testing of the program code, relative to the previous test. When a code component fails (the failure is expected since it is in the code itself, and so is reported by the code), that component stops running and thus may reduce the running time of the component as well as the overall code, causing an improvement in performance change to be detected. Different profiles can allow different maximum changes in percentages of failed components to trigger a notification. Thus, if more than 20% of the components in the program code fail during the previous test, and only 5% of the components fail in the current test, the change in percentage is 15%, and the manager profile will not allow the subscriber to be notified of the performance change, since that subscriber does not care about performance changes in code that had greater than 10% change in failures during testing.

Column 212 indicates the upper bound of the percentage of program components in the tested code that is allowed by the profile to fail due to unexpected errors occurring during the testing of the program code. These errors are external to the tested code, in other programs or systems which the program code is dependent upon for proper execution. Since the errors are external, the failure of the code is not predictable or reported by the code itself. For example, program code may access other external programs, or be processed by other external programs such as compilers or interpreters, which may have a failure or error. Different profiles can allow different maximum percentages of failed components due to these external errors to trigger a notification. In other embodiments, a change in percentage of errors between the previous test and current test can be indicated by column 212.

Figure 5A:
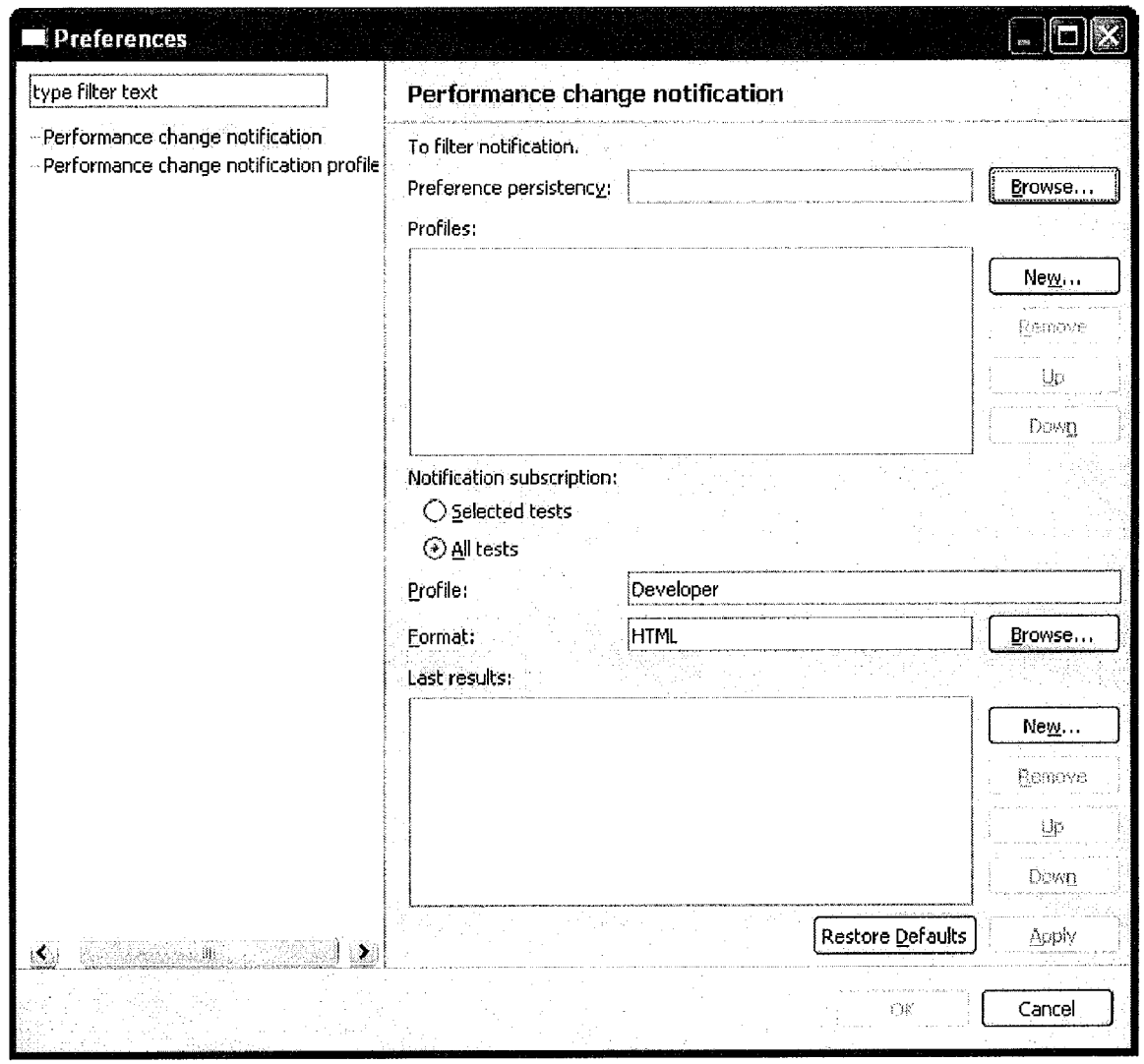
FIGS. 5A and 5B are diagrammatic illustrations of an interface allowing a subscriber to indicate preferences in subscriber information.
Figure 5B:
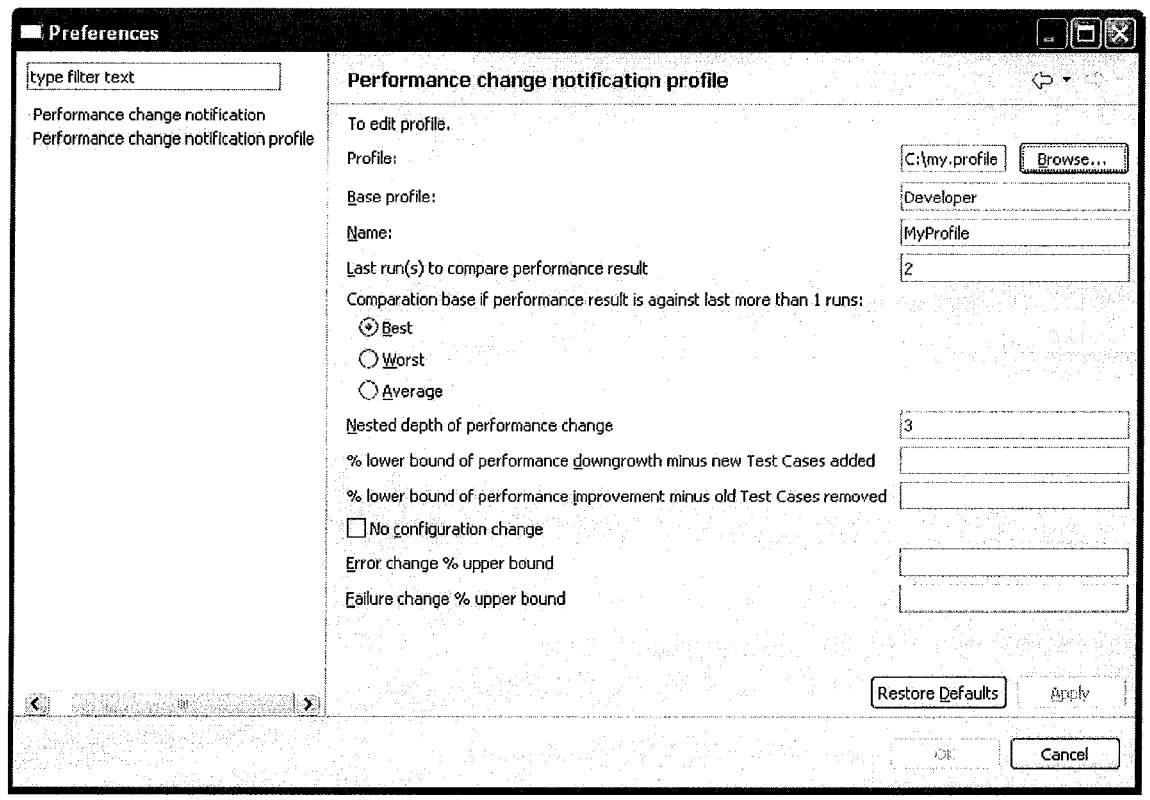

FIGS. 5A and 5B illustrate an example of an interface 220 allowing a subscriber to indicate a variety of preferences in subscriber information. In FIG. 5A, a subscriber may select to be notified for selected tests, or all tests performed on the program code. The subscriber may also input a preferred profile with which the subscriber will be associated, and a format which the notification will be provided. The subscriber may also select the location of the last results with which the current test will be compared to determine the performance change in the code. In FIG. 5B, an interface is shown where the subscriber can customize his or her own profile similar to the profiles shown in table 200 of FIG. 4, by inputting the identification and parameters of the profile.

Referring back to FIG. 2, in step 108 the method retrieves result location(s) for test results of the program code, these test results to be used in the current performance change detection. The location(s) of previous test results are retrieved, and the location of the current test results can also be retrieved. The previous results were stored in particular storage locations after previous tests were performed on the program code at an earlier time. Only the locations for the previous test results required for the preferences of the subscribers of the program code need be received. For example, if the subscribers only require a comparison to the last test results recorded, then only the location of the most recent previous test results need be retrieved. Other subscribers or embodiments may require different previous test results performed at some different time, or multiple previous test results, and the locations for these can also be retrieved in this step. Similarly, the location of the current test results indicates where the results for the current test may be loaded from. For example, the results retrieval block 16 of FIG. 1 can provide the locations of previous test results.

In step 110, the test results for the previous and current tests are loaded, e.g., from the locations received in step 108. For example, in the embodiment of FIG. 1, the performance result loading block 20 can load these test results and provide them to the manager 12. In some embodiments, the particular loader for the desired test results translates the format of the test results into a format or protocol understood by the manager 12.

In step 112, a performance change is determined between the current test and one or more previous tests. In some embodiments, the method 100 was initiated when a current test was performed, so that the current test and previous test(s) are compared. In other embodiments, the method 100 may have been initiated due to a different condition, and the performance change between two different previous test results can be determined, where one of these previous test results (e.g., the most recent) can be considered the "current" test results. The time of execution for the code in the current test is compared to the time(s) of execution in one or more previous tests to determine the performance change. The time of execution information was typically generated in most routine tests e.g., in a form such as timestamps (the routine tests themselves typically only measure whether the program code operated successfully or had one or more failures).

A subscriber can provide subscription preferences that indicate how the subscriber wants the performance change to be measured or determined. For example, one preference can be the particular previous test results used in the comparison. In one embodiment the performance determination can compare the time of execution in the current test results to the time of execution provided by the most recent previous test results. In other embodiments or preferences, the current test result can be compared to the previous test result having the best performance (lowest time of execution), or the previous test result having the worst performance (greatest time of execution), as determined from a pool of all or some of multiple previous test results. In still other embodiments, the current test result can be compared to an average of two or more previous test results. Other embodiments or preferences can designate different criteria for comparison. Another subscriber preference can indicate which, if any, of the components of the code should be analyzed for performance change, where the default preference can be to determine the performance change for each component of the code.

The difference in execution time between the current and previous test results is provided as a percentage of the execution time of the previous test results to indicate the change in performance of the code. In some embodiments, to determine an accurate performance change, the percentage change is modified by various compensation factors. In some embodiments, compensation(s) can always be performed, or in other embodiments the subscriber can specifically request or designate which compensation(s) should be used.

In one compensation, the percentage change can be offset by the change in execution time contributed by the addition or removal of components (test cases) to the program code after the previous test results were obtained. The addition of code components may have increased the execution time, while the removal of components may have decreased the execution time, and so this compensation provides a more accurate performance comparison. For example, the previous test results may describe the performance of the program code when it had five components. However, the current test results may describe the program code when it has seven components, since two components have been added in the interim between tests. The two new components will increase the execution time, which will falsely appear as a downgrade in performance unless the time increase associated with those two new components is subtracted from the time of the current test results (or from the performance change percentage). Likewise, the previous test results may describe the performance of the program code when it had five components, but the current test results may describe the program code when it has three components. The removal of the two components causes a decrease in the execution time, which will falsely appear as an improvement in performance unless the time decrease associated with those removed component tests are added to the time of the current test results (i.e., subtracted from the performance change percentage).

In another compensation, the percentage change can be weighted according to a baseline execution time, so that the weight of the change in performance is more accurately reflected. For example, if using the offset for component addition/removal described above, the weighting calculation can be performed after the offset. In one example, the baseline is the amount of execution time of the program code in the previous test used in the comparison, and the weighting increases the performance change percentage if the baseline is a large amount of time, and reduces the percentage if the baseline is a small amount of time. This allows the performance change percentage to reflect standard hardware and software variations in the execution time that are appropriately scaled to the time that the code normally takes to execute. For example, if the code normally executes in a very short time, then a very small time variation will impact the percentage change significantly when such a small variation may not be significant, and so the percentage change can be reduced. If the code executes over a much longer time, this same small time variation will appear insignificant, but may represent a more significant performance change, and so the percentage change can be increased.

In one embodiment, the logarithm of the baseline time is used to weight the percentage performance change. If the baseline is greater than $10^{X+1}$ milliseconds, the weighted performance change equals the percentage performance change multiplied by (log 10baseline−X). If the baseline is less than $10^{X-1}$ milliseconds, the weighted performance change equals the percentage performance change divided by (X−log 10baseline). In one example, X=5. The percentage change that is multiplied or divided here can be offset by test cases as described above.

The determined performance change can be used to filter out subscribers for notification based on the subscription information for each subscriber associated with the program code being checked for performance change. In step 114, a subscriber to notifications for the program code is selected. In step 116, the method determines whether the determined performance change for the code is significant for the selected subscriber. The term "significant" herein means that the performance change passes all the notification criteria for the subscriber so that the subscriber will be notified of the performance change. In the described embodiment, the notification criteria are determined from the profile, preferences, and/or other subscription information associated with the selected subscriber. For example, if the associated profile for the selected subscriber requires a compensated and weighted performance change of 10% or greater for notification, and the determined performance change is 9%, then the performance change is not significant for that subscriber. Other preferences as indicated in the profile table 200 of FIG. 3 are likewise used to check the significance of the performance change, as well as any other preferences provided in the subscription information. For example, in the described embodiment of FIG. 1, the performance change notification block 24 can perform the determination of significant performance changes using the change and subscription information, and provide the notification information to the manager 12.

If the performance change is not significant for the selected subscriber, then the process is complete at 120. No notification of the performance change is provided to the subscriber. If, however, the performance change is determined to be significant to the subscriber in step 116, then the process continues to step 118, where the selected subscriber is notified of the performance change. In the embodiment of FIG. 1, this can be performed by the notification submission block 26. The notification can be any of a variety of forms, as preferred by the subscriber. For example, the notification can be an email message, a pop-up dialog box, a table, in HTML or text, or in some other form of message. The notification can be provided over a communications network and/or stored on a storage device.

The process then returns to step 114 to select the next subscriber, and determine whether the performance change is significant for that subscriber in step 116. This is repeated until all the subscribers are analyzed and notified (if appropriate), at which point the process is complete at 120.

It should be noted that the process steps of method 100 are only one embodiment, and these steps can be provided in a different order, in parallel (where appropriate), or in different combinations in other embodiments. For example, in a different embodiment the notification of a subscriber in step 118 can be performed for all of the appropriate subscribers at the same time, after notification information for all subscribers has been determined in steps 114, 116, and 122.

The method 100 of FIG. 2 allows performance changes in program code to be detected automatically and in the background, while a user or subscriber is performing normal and routine testing of the code. This allows performance changes to be conveniently detected much more frequently than in previous dedicated performance testing and analysis. For example, the impact of code changes on the code performance can be detected between routine tests of software builds that are performed every day, rather than in previous implementations that only compared much more infrequent software releases and made it difficult to track which code changes caused performance degradation. Many program code projects or listings go through Unit Tests and Sandbox before "check-in," and after they are checked-in, go through BVTs and FVTs; and most milestones require FVTs and SVTs. Monitoring performance at these stages provides a better opportunity to review impact on overall performance. The invention allows performance degradation from code changes to be quickly detected and more easily traced and corrected.

Figure 6:
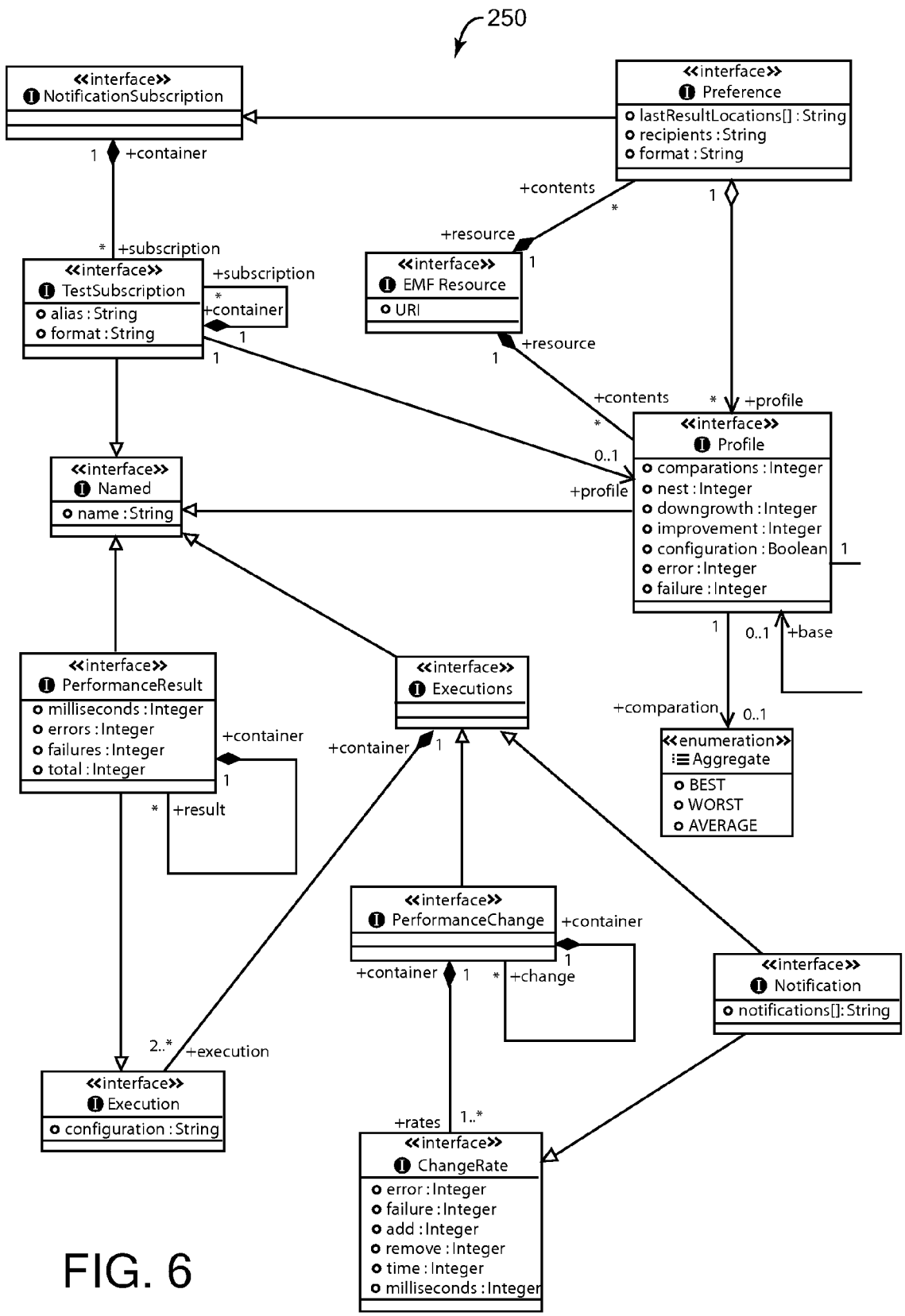
FIG. 6 is a class diagram in the Unified Modeling Language (UML) illustrating classes, attributes, and relationships between the classes in an example implementation of a system of the present invention.

FIG. 6 shows a Class diagram 250 in the Unified Modeling Language (UML) illustrating the classes, their attributes, and the relationships between the classes in the structure of an example implementation of a system of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining performance changes in program code, the method comprising:

accessing stored previous test results indicating a previous time of execution of the program code, the previous test results provided from a previous routine test of the program code;

accessing stored current test results indicating a current time of execution of the program code, the current test results provided from a current routine test of the program code, the current routine test being performed later than the previous routine test;

automatically comparing the previous time of execution and the current time of execution and determining a change in performance of the program code;

adjusting the change in performance to a weighted performance change based on the previous time of execution, such that the weighting reduces the effect of system variations on the performance of the program code, wherein the weighting increases the performance change if the previous time of execution is over a first predetermined amount of time, and the weighting decreases the performance change if the previous time of execution is below a second predetermined amount of time; and checking predetermined criteria associated with each of a plurality of users and notifying one or more particular users of the weighted performance change, wherein each of the one or more particular users is notified after the change in performance is determined to meet the predetermined criteria associated with that particular user.

2. The method of claim 1 wherein the previous routine test and the current routine test are each performed for a different build of the program code, and wherein determining the change in performance of the program code includes determining a change in performance of at least one component of the program code.

3. The method of claim 2 wherein the predetermined criteria associated with each of the plurality of users include a minimum percentage change in performance of the program code, wherein a performance change above the minimum percentage change meets at least one of the predetermined criteria for notification of the associated user.

4. The method of claim 3 wherein the predetermined criteria associated with each of the plurality of users include an upper bound of a number of external errors occurring external to the program code during the current routine test, the external errors occurring in at least one program or system external to the program code which the program code is dependent upon for execution, wherein a number of external errors exceeding the upper bound will prohibit the associated user from being notified of the performance change.

5. The method of claim 2 wherein the predetermined criteria associated with each of the plurality of users include an upper bound of a number of internal failures occurring in components of the program code during the current routine test, the internal failures causing at least one component of the program code to stop running, wherein a number of internal failures exceeding the upper bound will prohibit the associated user from being notified of the performance change.

6. The method of claim 2 wherein the comparison of the previous time of execution and the current time of execution includes comparing the current time of execution of the program code with a previous time of execution that is the best or worst previous test result of a plurality of previous test results.

7. The method of claim 1 wherein the predetermined criteria associated with each of the plurality of users include an indication of whether a configuration change of a system performing the previous routine test and the current routine test prohibits the associated user from being notified of the performance change, the configuration change including a change in hardware of the system.

8. The method of claim 1 wherein the performance change is provided as a percentage change.

9. The method of claim 1 wherein the predetermined criteria associated with each user includes a profile for the user, wherein at least two different users of the plurality of users are each associated with a different profile, and wherein each user has customized the predetermined criteria associated with that user for the change in performance.

10. The method of claim 1 further comprising modifying the weighted performance change by an offset determined from a change in execution time of the program code contributed by components added or removed from the program code after the previous time of execution was obtained.

11. A method for determining performance changes in program code, the method comprising:
    accessing stored previous test results indicating a previous time of execution of the program code, the previous test results provided from a previous routine test of the program code;
    accessing stored current test results indicating a current time of execution of the program code, the current test results provided from a current routine test of the program code, the current routine test being performed later than the previous routine test;
    automatically comparing the previous time of execution and the current time of execution and determining a change in performance of the program code, including modifying the change in performance by an offset determined from a change in execution time contributed by components added and removed from the program code after the previous time of execution was obtained and which can affect the accuracy of the performance change determination; and
    checking predetermined criteria associated with each of a plurality of users and notifying one or more particular users of the change in performance, wherein each of the one or more particular users is notified after the change in performance is determined to meet the predetermined criteria associated with that particular user, wherein the predetermined criteria include a predetermined percentage or more of change in performance of the program code,
    wherein the predetermined criteria include an upper bound of a number of internal failures occurring in components of the program code during the current routine test, the internal failures causing at least one component of the program code to stop running, wherein a number of internal failures exceeding the upper bound will prohibit the associated user from being notified of the performance change, and
    wherein the predetermined criteria include an upper bound of a number of external errors occurring external to the program code during the current routine test, the external errors occurring in at least one program or system external to the program code which the program code is dependent upon for execution, wherein a number of external errors exceeding the upper bound will prohibit the associated user from being notified of the performance change.

12. A computer readable non-transitory storage medium storing program instructions for determining performance changes in program code, the program instructions performing acts comprising:
    accessing stored previous test results indicating a previous time of execution of the program code, the previous test results provided from a previous routine test of the program code;
    accessing stored current test results indicating a current time of execution of the program code, the current test results provided from a current routine test of the program code, the current routine test being performed later than the previous routine test;
    automatically comparing the previous time of execution and the current time of execution and determining a change in performance of the program code;
    adjusting the change in performance to a weighted performance change based on the previous time of execution, such that the weighting reduces the effect of system variations on the performance of the program code, wherein the weighting increases the performance change if the previous time of execution is over a first predetermined amount of time, and the weighting decreases the performance change if the previous time of execution is below a second predetermined amount of time; and
    checking predetermined criteria associated with each of a plurality of users and notifying one or more particular users of the change in performance, wherein each of the one or more particular users is notified after the change in performance is determined to meet the predetermined criteria associated with that particular user.

13. The computer readable medium of claim 12 wherein the previous routine test and the current routine test are each performed for a different build of the program code, and wherein determining the change in performance of the program code includes determining a change in performance of at least one component of the program code.

14. The computer readable medium of claim 13 wherein the predetermined criteria associated with each of the plurality of users include a minimum percentage change in performance of the program code, wherein a performance change above the minimum percentage change meets at least one of the predetermined criteria for notification of the associated user.

15. The computer readable medium of claim 14 wherein the predetermined criteria associated with each of the plurality of users include an upper bound of a number of external errors occurring external to the program code during the current routine test, wherein a number of external errors exceeding the upper bound will prohibit the associated user from being notified of the performance change.

16. The computer readable medium of claim 13 wherein the predetermined criteria associated with each of the plurality of users include an upper bound of a number of internal failures occurring in components of the program code during the current routine test, wherein a number of internal failures exceeding the upper bound will prohibit the associated user from being notified of the performance change.

17. The computer readable medium of claim 13 wherein the comparison of the previous time of execution and the current time of execution includes comparing the current time of execution of the program code with a previous time of execution that is the best or worst previous test result of a plurality of previous test results.

18. The computer readable medium of claim 12 wherein the predetermined criteria associated with each of the plurality of users include an indication of whether a configuration change of a system performing the previous routine test and the current routine test prohibits the associated user from being notified of the performance change.

19. The computer readable medium of claim 12 wherein the performance change is provided as a percentage change.

20. The computer readable medium of claim 12 wherein the predetermined criteria associated with each user includes a profile for the user, wherein at least two different users of the plurality of users are each associated with a different profile, and wherein each user has customized the predetermined criteria associated with that user for the change in performance.

* * * * *